United States Patent [19]
Wright et al.

[11] Patent Number: 5,669,672
[45] Date of Patent: Sep. 23, 1997

[54] WHEEL TRIM ATTACHMENT SYSTEM FOR DIFFERENT BOLT PATTERNS

[75] Inventors: James P. Wright; Timothy L. Bates; Kevin D. Nash; Barry Lynn Roberts, all of Cookeville; John Davenport, Crossville, all of Tenn.

[73] Assignee: Pheonix USA, Inc., Cookeville, Tenn.

[21] Appl. No.: 602,510

[22] Filed: Feb. 20, 1996

[51] Int. Cl.⁶ ................................................. B60B 7/10
[52] U.S. Cl. ............................... 301/37.37; 301/108.4
[58] Field of Search .................. 301/108.1, 108.4, 301/37.1, 37.37, 35.62, 37.29

[56] References Cited

U.S. PATENT DOCUMENTS

| | | | |
|---|---|---|---|
| 3,649,079 | 3/1972 | English | 301/35.62 |
| 3,833,266 | 9/1974 | Lamme | 301/37.1 X |
| 4,478,458 | 10/1984 | Flexman | 301/35.62 X |
| 5,205,614 | 4/1993 | Wright | 301/37.37 |
| 5,443,582 | 8/1995 | Ching | 301/37.37 |
| 5,503,465 | 4/1996 | Price et al. | 301/37.37 |

*Primary Examiner*—Russell D. Stormer
*Attorney, Agent, or Firm*—Waddey & Patterson; Edward D. Lanquist, Jr.

[57] ABSTRACT

The present invention discloses a wheel trim attachment system for trailer wheels. In the present invention, a bracket is provided having a cloverleaf hole which can receive lugs sized and spaced for a six lug, eight lug, and ten lug variety. Additionally, a mounting orifice is provided which can be placed on the wheel at a constant radius from the center of the wheel to allow a single wheel liner to be attached to different sized wheels. Attachments can be used to attach the wheel liner to the bracket. The wheel liner can have lug covers and hub covers.

7 Claims, 5 Drawing Sheets

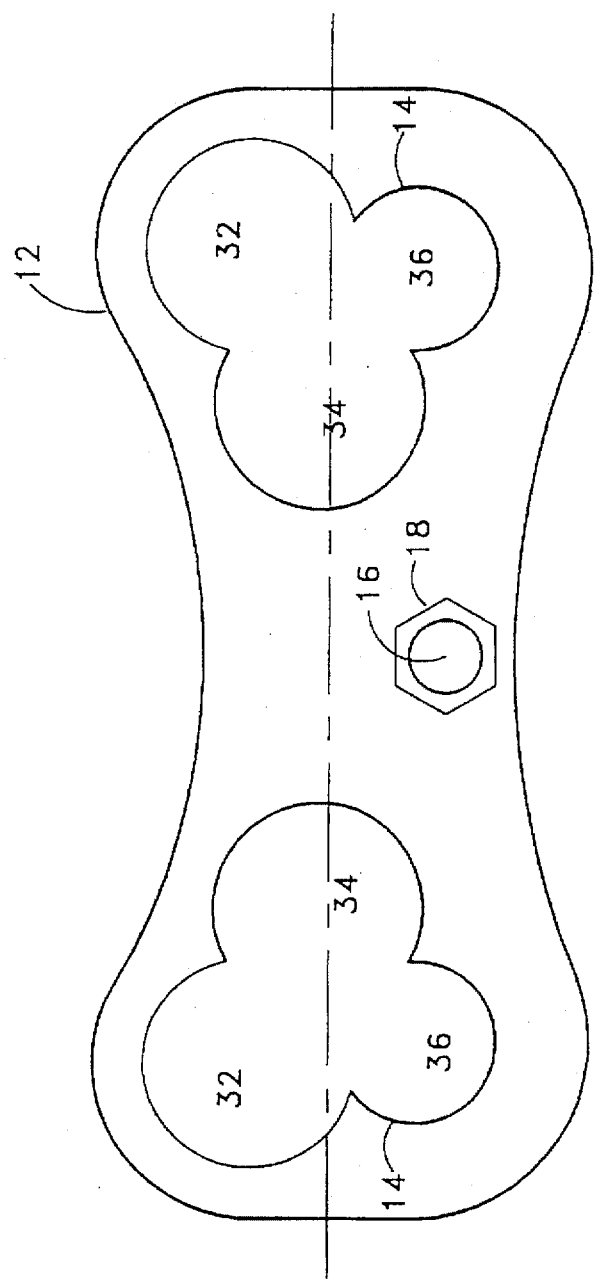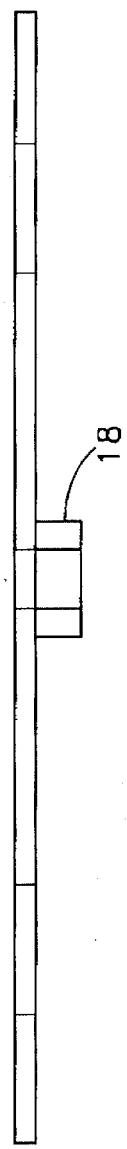
Fig. 5b
Fig. 5a

WHEEL TRIM ATTACHMENT SYSTEM FOR DIFFERENT BOLT PATTERNS

BACKGROUND OF THE INVENTION

The present invention relates generally to wheel trim attachment systems and more particularly to a universal wheel trim attachment system for trailer wheels.

It will be appreciated by those skilled in the art that trailer wheels come with different numbers of lugs and with different diameter bolt circles. It will further be appreciated by those skilled in the art that having a different wheel trim attachment system for each wheel design is very inefficient and expensive.

What is needed, then, is a system which allows attachment of wheel trim to several different wheels. This needed system must be easy to remove and replace so that the trailer axle can be oiled. This needed system must allow for a single liner to be placed on wheels with different numbers of lugs and with different diameter bolt circles. This needed system is presently lacking in the prior art.

SUMMARY OF THE INVENTION

The present invention discloses a wheel trim attachment system for trailer wheels. In the present invention, a bracket is provided having a cloverleaf hole which can receive lugs sized and spaced for a six lug, either lug, and ten lug on two different diameter bolt circles. Additionally, a mounting orifice is provided which can be placed on the wheel at a constant radius from the center of the wheel to allow one wheel liner to be attached to wheels with different bolt circles. Attachments can be used to attach the wheel liner to the bracket. The wheel liner can have lug covers and hub covers.

Accordingly, one object of the present invention is to provide a wheel trim attachment system for trailer wheels.

Another object of the present invention is to provide a universal trailer wheel bracket that can be used in connection with six lug, eight lug, and ten lug wheels with two different diameter bolt circles.

Another object of the present invention is to provide one wheel liner that can be used in connection with six lug, eight lug, and ten lug wheels with two different bolt circles.

BRIEF DESCRIPTION OF THE DRAWINGS

FIG. 5a and b is a plan view of the bracket of the present invention.

DESCRIPTION OF THE PREFERRED EMBODIMENT

Figure 1:
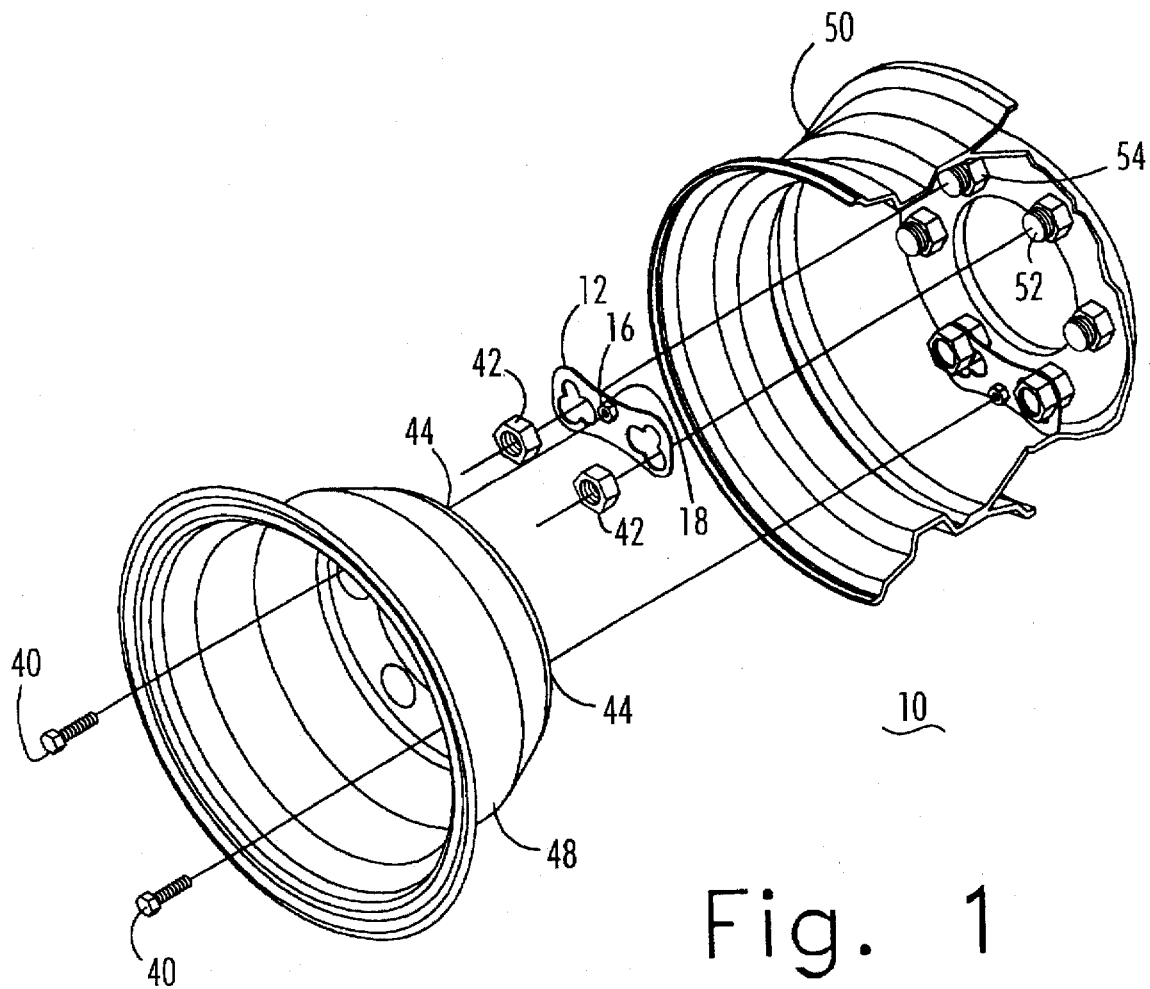
FIG. 1 is an exploded view of the wheel trim attachment system for trailer wheels of the present invention as used in connection with a six lug wheel having a 8.75 inch diameter bolt circle.

Referring now to FIG. 1, there is shown generally at 10 the wheel trim attachment system for trailer wheels of the present invention. In the present invention, bracket 12 of the present invention is attached to wheel 50 to lugs 52 by jam nuts 42. Attachment screws 40 pass through hole 44 in wheel liner 48 and are received by threaded orifice 16 and nut 18 which is attached to bracket 12.

Referring now to FIG. 5, there is shown generally at 12, the bracket of the present invention. Bracket 12 has cloverleaf holes 14. Cloverleaf holes 14 are created by eight lug holes 32, ten lug holes 34, and six lug holes 36. Eight lug holes 32 are located 56.62 mm horizontally and 4.02 mm vertically from center of threaded orifice 16. Ten lug holes 34 are located 34.34 mm horizontally and 17.32 mm vertically from center of threaded orifice 16. Six lug holes 36 are located 55.57 mm horizontally and 26.77 vertically from center of threaded orifice 16. This hole arrangement places center of threaded orifice 16 123.01 mm from the center of each wheel configuration. Bracket 12 has centerline represented by line shown in FIG. 5b and called centerline 35. Threaded orifice 16 lies preferably 16.04 millimeters from centerline 35.

Figure 2:
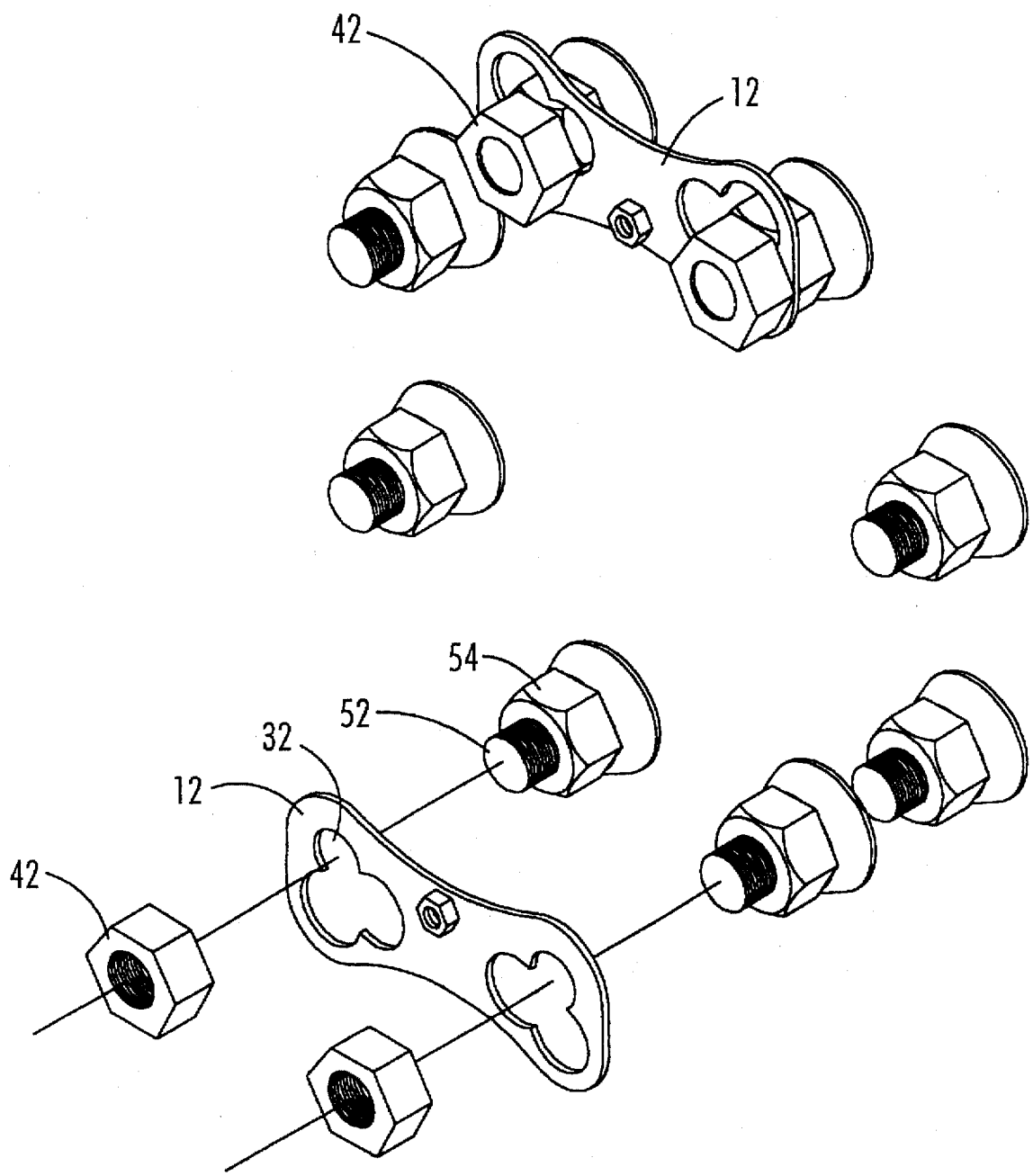
FIG. 2 is a plan view showing the bracket of the present on an eight lug wheel with a 275 mm diameter bolt circle.

Referring now to FIG. 2, one can see the bracket 12 placement for an eight lug wheel 50'.

Figure 3:
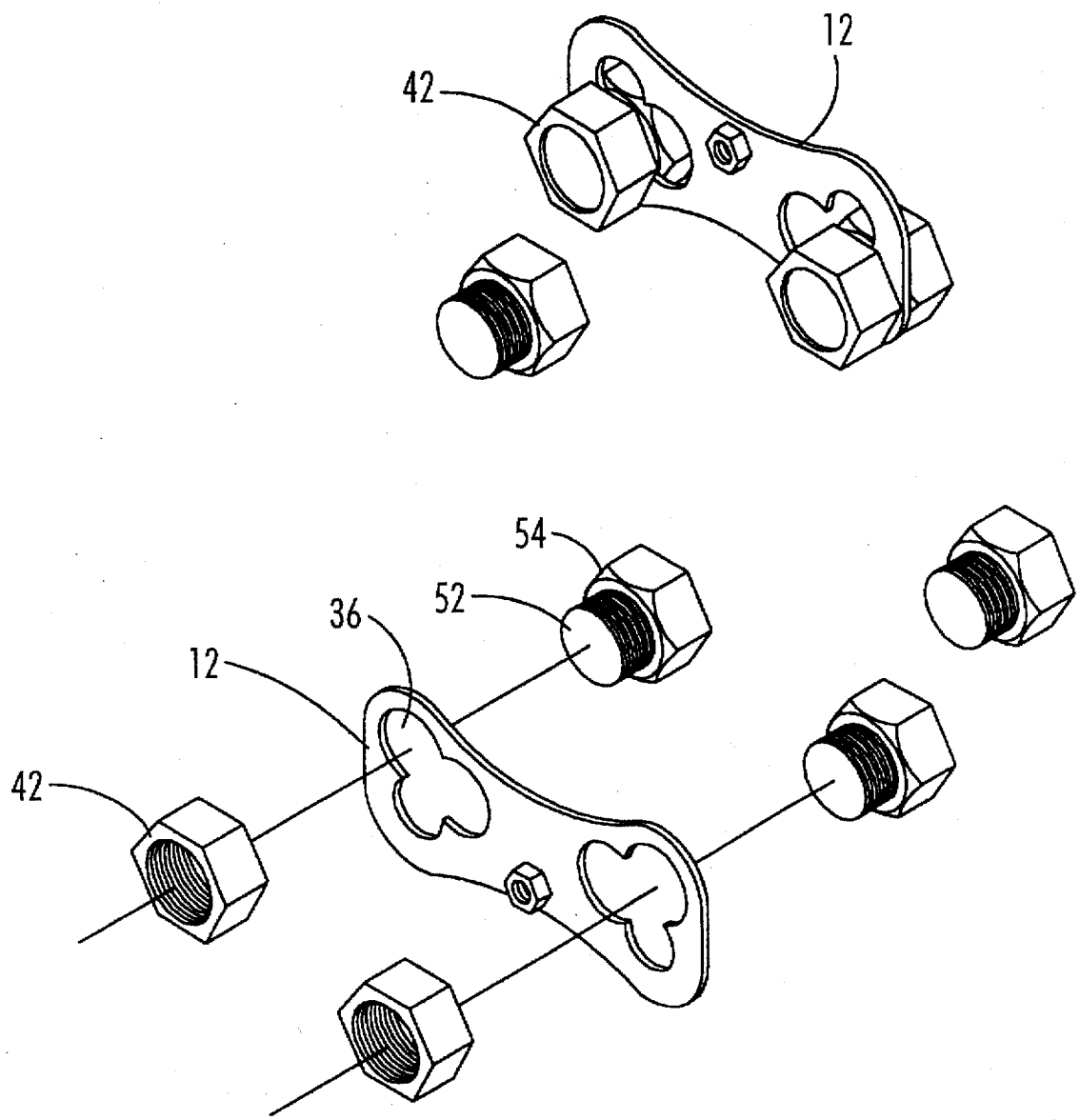
FIG. 3 is a plan view showing the bracket of the present invention on a six lug wheel with a 8.75" diameter bolt circle.

Referring now to FIG. 3, one can see the bracket 12 placement for a six lug wheel 50".

Figure 4:
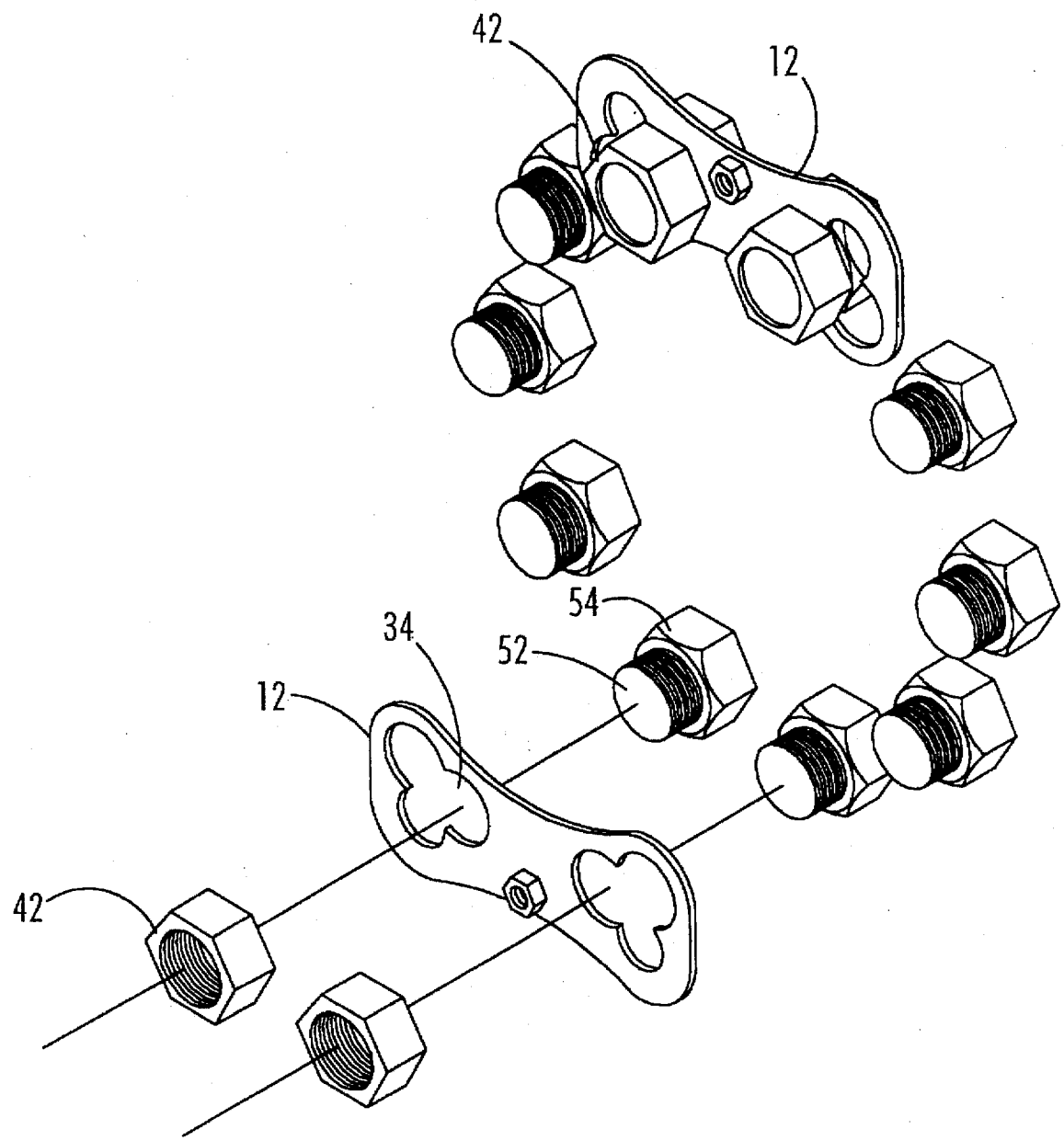
FIG. 4 is a plan view showing the bracket of the present invention on a ten lug wheel with a 8.75" diameter bolt circle.

Referring now to FIG. 4, one can see the bracket 12 placement for a ten lug wheel 50'".

Thus, although there have been described particular embodiments of the present invention of a new and useful wheel trim attachment system for different bolt patterns, it is not intended that such references be construed as limitations upon the scope of this invention except as set forth in the following claims. Further, although there have been described certain dimensions used in the preferred embodiment, it is not intended that such dimensions be construed as limitations upon the scope of this invention except as set forth in the following claims.

What We claim is:

1. A wheel trim attachment system comprising:
   a. a wheel liner;
   b. a bracket having a clover leaf hole;
   c. means for attaching said wheel liner to said bracket; and
   d. wherein said clover leaf hole having a six lug hole, an eight lug hole, and a ten lug hole.

2. The system of claim 1 wherein said means for attaching said wheel liner to said bracket comprises:
   a. said wheel liner having an opening;
   b. said bracket having a threaded orifice; and
   b. an attachment screw received by said opening and said mounting orifice.

3. The system of claim 2 wherein said clover leaf having a clover leaf center line and said mounting orifice substantially 16.04 mm from said clover leaf center line.

4. A system for attaching a wheel liner to a wheel having plural lugs and plural lug nuts:
   a. a bracket having plural clover leaf holes receiving said plural lugs and attached to said wheel by said plural lug nuts;
   b. means for attaching said wheel liner to said bracket; and
   c. each of said clover leaf holes having a six lug hole, an eight lug hole, and a ten lug hole.

5. The system of claim 4 wherein said means for attaching said wheel liner to said bracket comprises:

a. said wheel liner having an opening;

b. said bracket having a threaded orifice; and b. an attachment screw received by said opening and said mounting orifice.

6. The system of claim 5 wherein said clover leaf having a clover leaf center line and said mounting orifice substantially 16.04 mm from said clover leaf center line.

7. A universal system for attaching a wheel liner to a wheel having six lugs and lug nuts, eight lugs and lug nuts, or ten lugs and lug nuts comprising:

a. a bracket having a pair of clover leaf holes, each of said clover leaf holes having a six lug hole, and eight lug hole, and a ten lug hole, said pair of clover leaf holes having a clover leaf center line, said bracket having a threaded orifice substantially 16.04 mm from said clover leaf center line, said bracket attached to said wheel by pairs of said lug nuts; and b. means for attaching said wheel liner to said bracket.

* * * * *